US012407075B2

(12) United States Patent
Arai et al.

(10) Patent No.: US 12,407,075 B2
(45) Date of Patent: Sep. 2, 2025

(54) DIELECTRIC FILTER

(71) Applicant: Murata Manufacturing Co., Ltd., Kyoto-fu (JP)

(72) Inventors: Masashi Arai, Nagaokakyo (JP); Tatsunori Kan, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 174 days.

(21) Appl. No.: 18/475,560

(22) Filed: Sep. 27, 2023

(65) Prior Publication Data

US 2024/0021967 A1 Jan. 18, 2024

Related U.S. Application Data

(63) Continuation of application No. PCT/JP2022/000654, filed on Jan. 12, 2022.

(30) Foreign Application Priority Data

Mar. 29, 2021 (JP) ................................. 2021-055346

(51) Int. Cl.
*H01P 1/205* (2006.01)
*H01P 1/20* (2006.01)
*H01P 3/16* (2006.01)

(52) U.S. Cl.
CPC .......... *H01P 1/2002* (2013.01); *H01P 1/2053* (2013.01); *H01P 3/16* (2013.01)

(58) Field of Classification Search
CPC ........ H01P 1/2002; H01P 1/202; H01P 1/205; H01P 1/2053; H01P 1/2056; H01P 1/20;
(Continued)

(56) References Cited

U.S. PATENT DOCUMENTS 11,862,835 B2 * 1/2024 Chou ........................ H01P 3/16
12,051,847 B2 * 7/2024 Tada ......................... H01P 7/04

FOREIGN PATENT DOCUMENTS

JP H05-267907 A 10/1993
JP 2003-218604 A 7/2003
(Continued)

OTHER PUBLICATIONS

International Search Report for PCT/JP2022/000654 dated Mar. 29, 2022.

*Primary Examiner* — Stephen E. Jones
(74) *Attorney, Agent, or Firm* — McDonald Hopkins LLC

(57) ABSTRACT

A filter device includes a laminated body, a plurality of resonator portions, and a plurality of capacitor portions facing the plurality of resonator portions in a Y-axis direction, respectively. Each of the resonator portions is formed by a plurality of resonant electrode elements. Each of the capacitor portions is formed by a plurality of capacitive electrode elements. The plurality of resonant electrode elements in the resonator portion are formed such that all of facing ends with respect to the capacitive electrode elements do not overlap with each other when viewed in a planar view from a Z-axis direction. The capacitive electrode elements in the capacitor portion are formed such that a gap between the capacitive electrode element and the resonant electrode element facing each other in a Y-axis direction is substantially constant in each layer in the Z-axis direction.

5 Claims, 9 Drawing Sheets

(58) Field of Classification Search
CPC ............ H01P 1/201; H01P 1/203; H01P 3/16; H01P 3/08; H01P 3/085; H01P 3/088; H01P 3/122; H01P 7/08; H01P 7/084
See application file for complete search history.

(56) References Cited

FOREIGN PATENT DOCUMENTS

| | | | |
|---|---|---|---|
| JP | 2007-235465 | A | 9/2007 |
| JP | 2020-510326 | A | 4/2020 |

* cited by examiner

DIELECTRIC FILTER

CROSS REFERENCE TO RELATED APPLICATION

This is a continuation of International Application No. PCT/JP2022/000654 filed on Jan. 12, 2022 which claims priority from Japanese Patent Application No. 2021-055346 filed on Mar. 29, 2021. The contents of these applications are incorporated herein by reference in their entireties.

BACKGROUND OF THE DISCLOSURE

Field of the Disclosure

The present disclosure relates to a band-pass filter (hereinafter also referred to as a "dielectric filter") using a dielectric resonator.

Description of the Related Art

In Japanese Patent Laid-Open No. 2007-235465 (PTL 1), a band-pass filter using a dielectric resonator is described. The filter includes a cuboid laminated body formed by laminating a plurality of dielectric layers in a lamination direction, a first terminal and a second terminal disposed on a first side surface and a second side surface facing each other in the laminated body, respectively, and a resonator portion and a capacitor portion disposed on the inside of the laminated body. The resonator portion is formed by a plurality of electrode elements laminated in the lamination direction, connected to the first terminal, and spaced apart from the second terminal. Out of the plurality of electrode elements of the resonator portion, an electrode element in an upper layer and an electrode element in a lower layer protrude more to the second terminal side as compared to other electrode elements. The capacitor portion is formed by one electrode element, is connected to the second terminal, extends between the electrode element in the upper layer and the electrode element in the lower layer of the resonator portion, and forms a capacity between the capacitor portion and the resonator portion by a gap between the electrode element in the upper layer and the electrode element in the lower layer of the resonator portion in the lamination direction.

PTL 1: Japanese Patent Laid-Open No. 2007-235465

BRIEF SUMMARY OF THE DISCLOSURE

In the filter described in Japanese Patent Laid-Open No. 2007-235465, the resonator portion connected to the first terminal is formed by the plurality of electrode elements, but the capacitor portion connected to the second terminal is formed by one electrode element. Therefore, in the filter, density (hereinafter also referred to as "electrode lamination density") of the electrodes in the lamination direction becomes coarse in a region near the second terminal and dense in a region in which the resonator portion is provided. As a result, there is a concern that a difference in the electrode lamination density in the filter may increase, and dimensional accuracy of the filter may be degraded due to the influence thereof.

The present disclosure has been made in order to solve the problem as above, and a possible benefit thereof is to secure the dimensional accuracy of a dielectric filter by reducing an electrode lamination density difference in the dielectric filter.

A dielectric filter according to the present disclosure includes: a cuboid laminated body formed by laminating a plurality of dielectric layers in a lamination direction, the cuboid laminated body having a first side surface and a second side surface perpendicular to a first direction orthogonal to the lamination direction; a first plate electrode and a second plate electrode disposed to be spaced apart from each other in the lamination direction on an inside of the laminated body; a first terminal and a second terminal disposed on the first side surface and the second side surface of the laminated body, respectively, and connected to the first plate electrode and the second plate electrode; a plurality of resonator portions disposed side by side in a second direction orthogonal to the lamination direction and the first direction in a region between the first plate electrode and the second plate electrode in the laminated body; and a plurality of capacitor portions disposed to face the plurality of resonator portions, respectively, in the first direction in a region between the plurality of resonator portions and the second terminal in the laminated body. Each of the plurality of resonator portions is formed by a plurality of resonant electrode elements laminated in the lamination direction, is connected to the first terminal, and is spaced apart from the second terminal. Each of the plurality of capacitor portions is formed by a plurality of capacitive electrode elements laminated in the lamination direction, is connected to the second terminal, and forms a capacity between the capacitor portion and the resonator portion that faces the capacitor portion in the first direction. The plurality of resonant electrode elements in each of the resonator portions are formed such that all or some of at least one of facing ends and side surfaces, the facing ends facing the plurality of capacitive electrode elements, the side surfaces being perpendicular to the second direction do not overlap with each other when viewed in a planar view from the lamination direction. The plurality of capacitive electrode elements in each of the capacitor portions are formed such that a distance from a resonant electrode element and a capacitive electrode element is substantially constant in each layer in the lamination direction, the resonant electrode element and the capacitive electrode element facing each other in the first direction.

According to the present disclosure, it becomes possible to secure the dimensional accuracy of the dielectric filter by reducing the electrode lamination density difference in the dielectric filter.

DETAILED DESCRIPTION OF THE DISCLOSURE

Figure 1:
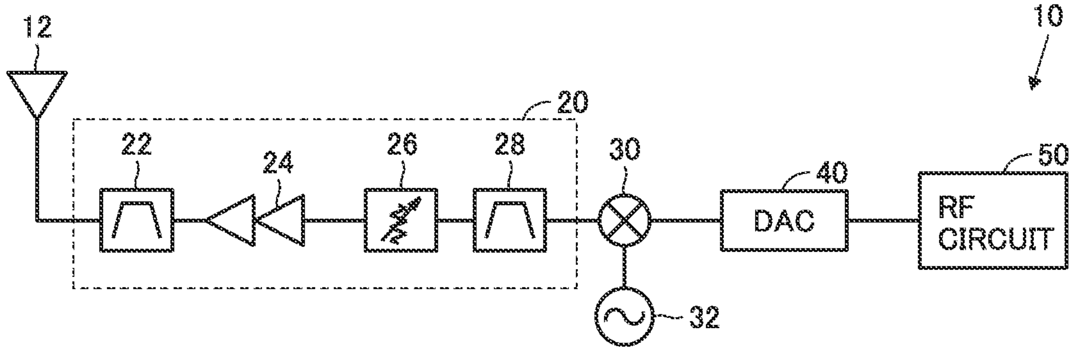
FIG. 1 is a block diagram of a communication device.

An embodiment of the present disclosure is described in detail below with reference to the drawings. The same or equivalent parts in the drawings are denoted by the same reference characters, and description thereof is not repeated.

(Basic Configuration of Communication Device)

FIG. 1 is a block diagram of a communication device 10 having a high-frequency front-end circuit 20 to which a filter device according to an embodiment of the present disclosure is applied. Communication device 10 is a mobile terminal as represented by a smartphone or a mobile phone base station, for example.

With reference to FIG. 1, communication device 10 includes an antenna 12, high-frequency front-end circuit 20, a mixer 30, a local oscillator 32, a D/A converter (DAC) 40, and an RF circuit 50. High-frequency front-end circuit 20 includes band-pass filters 22, 28, an amplifier 24, and an attenuator 26. In FIG. 1, a case where high-frequency front-end circuit 20 includes a transmission circuit that transmits high-frequency signals from antenna 12 is described. However, high-frequency front-end circuit 20 may include a reception circuit that receives high-frequency signals via antenna 12.

Communication device 10 upconverts a signal transmitted from RF circuit 50 to a high-frequency signal and emits the high-frequency signal from antenna 12. A modulated digital signal output from RF circuit 50 is converted to an analog signal by D/A converter 40. Mixer 30 upconverts the signal converted to the analog signal by D/A converter 40 to a high-frequency signal by mixing the signal with an oscillation signal from local oscillator 32. Band-pass filter 28 removes spurious waves generated by upconversion and extracts only signals in a desired frequency band. Attenuator 26 adjusts the intensity of a transmission signal. Amplifier 24 amplifies the electric power of the transmission signal that has passed through attenuator 26 to a predetermined level. Band-pass filter 22 removes spurious waves generated in the amplification process and causes only signal components in a frequency band defined by a communication standard to pass. The transmission signal that has passed through band-pass filter 22 is emitted from antenna 12.

The filter device corresponding to the present disclosure can be employed as band-pass filters 22, 28 in communication device 10 as described above.

(Configuration of Filter Device)

Figure 2:
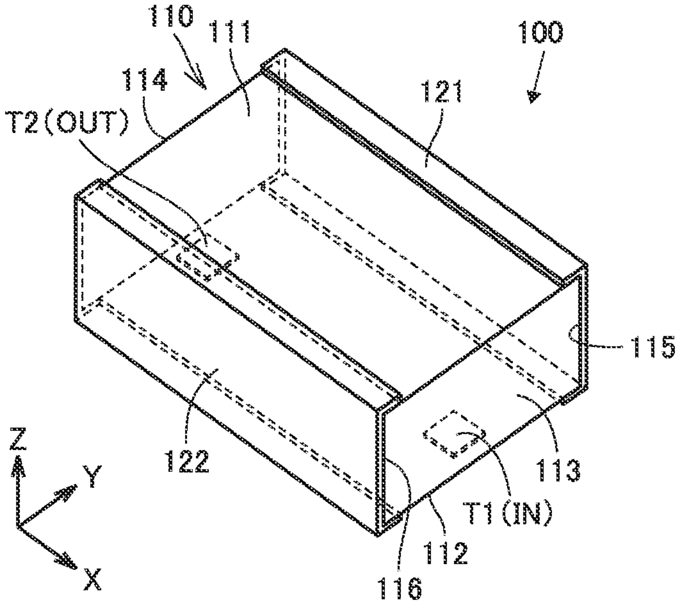
FIG. 2 is an external perspective view of a filter device.
Figure 3:
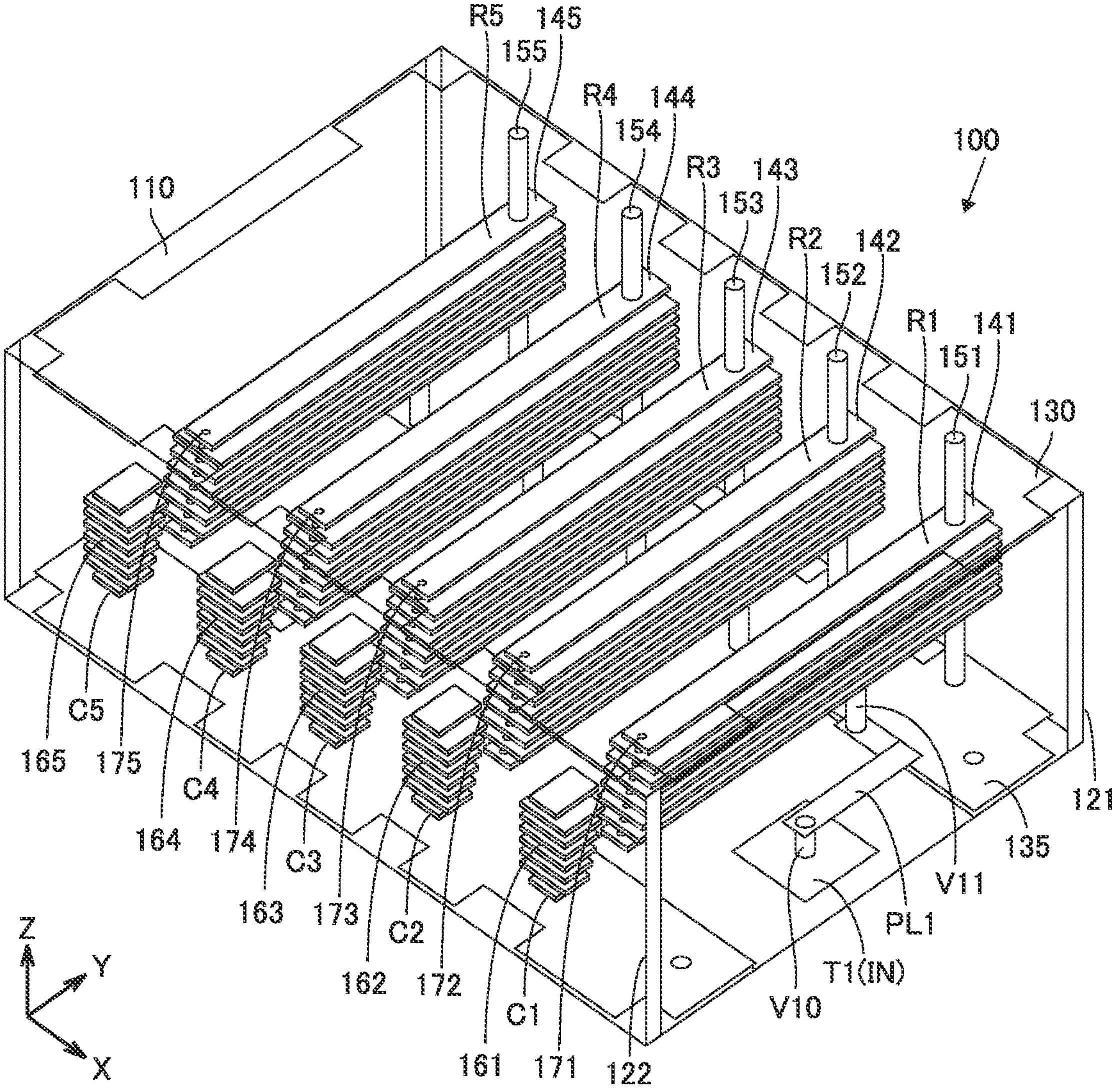
FIG. 3 is a transparent perspective view showing an inner structure of the filter device.
Figure 4:
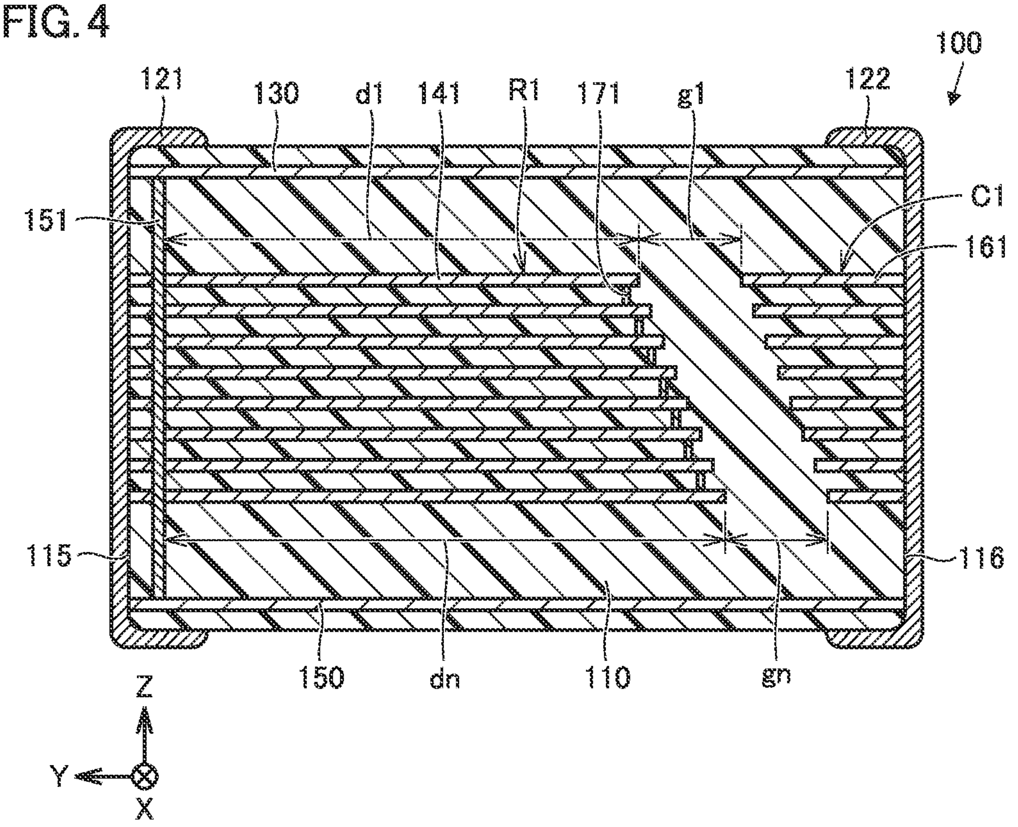
FIG. 4 is one example (part one) of a cross-sectional view of the filter device.

Next, with reference to FIG. 2 to FIG. 4, a detailed configuration of a filter device 100 according to the present embodiment is described. Filter device 100 is a dielectric filter configured by a plurality of resonators (resonator portions).

FIG. 2 is an external perspective view of filter device 100. In FIG. 2, only configurations that can be viewed from an outer front surface of filter device 100 are shown, and configurations on the inside are omitted. Meanwhile, FIG. 3 is a transparent perspective view showing an inner structure of filter device 100.

With reference to FIG. 2, filter device 100 includes a cuboid or substantially cuboid laminated body 110 formed by laminating a plurality of dielectric layers in a lamination direction. Each dielectric layer of laminated body 110 is formed by ceramic such as low temperature co-fired ceramics (LTCC). The material of laminated body 110 is not necessarily limited to ceramic and may be resin, for example.

On the inside of laminated body 110, resonant electrode elements that form the resonator portions, and capacitors and inductors for coupling the resonant electrode elements to each other are formed by a plurality of electrodes formed on each dielectric layer and a plurality of vias formed between the dielectric layers. In the present specification, the term "via" means a conductor that is formed to connect electrodes formed in different dielectric layers to each other and that extends in the lamination direction. The via is formed by a conductive paste, plating, and/or a metal pin, for example.

In the description below, the lamination direction of laminated body 110 is a "Z-axis direction", a direction perpendicular to the Z-axis direction and along a short edge of laminated body 110 is a "Y-axis direction" (first direction), and a direction along a long edge of laminated body 110 is an "X-axis direction" (second direction). A positive direction of a Z-axis in each drawing may be referred to as an upper side, and a negative direction of the Z-axis may be referred to as a lower side below.

As shown in FIG. 2, in filter device 100, shield terminals 121, 122 are disposed so as to respectively cover side surfaces 115, 116 perpendicular to the Y-axis direction in laminated body 110. Shield terminals 121, 122 each have a substantially C-like shape when viewed from the X-axis direction of laminated body 110. In other words, shield terminals 121, 122 cover a part of an upper surface 111 and a lower surface 112 of laminated body 110. Parts of shield terminals 121, 122 disposed on lower surface 112 of laminated body 110 are connected to a ground electrode on a mounting substrate (not shown) by a connecting member such as a solder bump. In other words, shield terminals 121, 122 also function as ground terminals.

An input terminal T1 and an output terminal T2 are disposed on lower surface 112 of laminated body 110. Input terminal T1 is disposed on lower surface 112 at a position close to side surface 113 in the positive direction of the X-axis. Output terminal T2 is disposed on lower surface 112 at a position close to side surface 114 in the negative direction of the X-axis. Input terminal T1 and output terminal T2 are connected to corresponding electrodes on the mounting substrate by connecting members such as solder bumps.

Next, with reference to FIG. 3, filter device 100 further includes plate electrodes 130, 135, a plurality of resonator portions R1 to R5, connection conductors 151 to 155, 171 to 175, and a plurality of capacitor portions C1 to C5 in addition to the configurations shown in FIG. 2. Connection conductors 151 to 155, 171 to 175 may be omitted.

Plate electrodes 130, 135 are disposed to face each other in positions spaced apart from each other in the lamination direction (Z-axis direction) on the inside of laminated body 110. Plate electrode 130 is formed in a dielectric layer close to upper surface 111 and is connected to shield terminals 121, 122 at end portions along the X-axis. Plate electrode 130 has a shape that substantially covers upper surface 111 of laminated body 110 when viewed in a planar view from the lamination direction.

Plate electrode 135 is formed in a dielectric layer close to lower surface 112. Plate electrode 135 has a substantially H-like shape in which cut-out portions are formed in parts facing input terminal T1 and output terminal T2 when viewed in a planar view from the lamination direction. Plate electrode 135 is also connected to shield terminals 121, 122 at end portions along the X-axis.

The plurality of resonator portions R1 to R5 are disposed in a region between plate electrode 130 and plate electrode 135 on the inside of laminated body 110. The plurality of resonator portions R1 to R5 are disposed side by side to be spaced apart from each other by a predetermined distance in the X-axis direction. More specifically, resonator portions R1, R2, R3, R4, R5 are disposed in the stated order from the positive direction to the negative direction of the X-axis.

Each of resonator portions R1 to R5 extends in the Y-axis direction, and an end portion of each resonator portion in the positive direction of the Y-axis is connected to shield terminal 121. Meanwhile, an end portion of each resonator portion in the negative direction of the Y-axis is spaced apart from shield terminal 122.

Resonator portion R1 is formed by a plurality of resonant electrode elements 141 laminated in the lamination direction. Similarly, resonator portion R2 is formed by a plurality of resonant electrode elements 142 laminated in the lamination direction, resonator portion R3 is formed by a plurality of resonant electrode elements 143 laminated in the lamination direction, resonator portion R4 is formed by a plurality of resonant electrode elements 144 laminated in the lamination direction, and resonator portion R5 is formed by a plurality of resonant electrode elements 145 laminated in the lamination direction. In FIG. 3, a case where the number (number of lamination) of each of resonant electrode elements 141 to 145 is “eight” is exemplified, but the number of each of resonant electrode elements 141 to 145 is not limited to “eight”. For example, the number of each of resonant electrode elements 141 to 145 may be a number greater than eight (for example, 13 or more).

In the present embodiment, elements formed in the uppermost layer and the lowermost layer out of the plurality of resonant electrode elements 141 are formed to have a width (dimension in the X-axis direction) that is smaller than widths of elements formed in layers near the center. The same applies to other resonant electrode elements 142 to 145. The width of each of resonant electrode elements 141 to 145 may all be the same value.

Resonator portions R1 to R5 are connected to plate electrodes 130, 135, respectively, via connection conductors 151 to 155 at positions close to end portions in the positive direction of the Y-axis. In filter device 100, each of connection conductors 151 to 155 extends from plate electrode 130 to plate electrode 135 by passing through the plurality of elements of a corresponding resonator portion along the Z-axis direction. Connection conductors 151 to 155 are electrically connected to the plurality of corresponding resonator portions, respectively.

The plurality of resonant electrode elements configuring each of resonator portions R1 to R5 are electrically connected by connection conductors 171 to 175 at positions close to end portions in the negative direction of the Y-axis. As described below, each of connection conductors 171 to 175 is formed by a plurality of via conductors that each connect adjacent electrodes to each other.

Resonator portions R1 to R5 are central conductors formed by a plurality of conductors and each function as a distributed-parameter TEM mode resonator using plate electrodes 130, 135 as external conductors.

An element in the lowermost layer out of the plurality of resonant electrode elements 141 forming resonator portion R1 is connected to input terminal T1 via vias V10, V11 and a plate electrode PL1. In FIG. 3, although hidden by the resonant electrode elements, an element in the lowermost layer out of the plurality of resonant electrode elements 145 forming resonator portion R5 is connected to output terminal T2 via vias and a plate electrode. Resonator portions R1 to R5 are magnetically coupled to each other, and a high-frequency signal input to input terminal T1 is transmitted by resonator portions R1 to R5 and output from output terminal T2. At this time, an attenuation pole is generated due to a coupling degree between the resonator portions. As a result, filter device 100 functions as a band-pass filter.

Capacitor portions C1 to C5 are disposed to face the end portions of resonator portions R1 to R5 in the negative direction of the Y-axis, respectively. In other words, an end portion of each of capacitor portions C1 to C5 in the positive direction of the Y-axis faces an end portion of the corresponding resonator portion in the negative direction of the Y-axis to be spaced apart from the end portion of the corresponding resonator portion by a predetermined distance in the Y-axis direction. Meanwhile, an end portion of each of capacitor portions C1 to C5 in the negative direction of the Y-axis is connected to shield terminal 122. As a result, the end portion of each capacitor portion in the positive direction of the Y-axis forms a capacity between the end portion of the capacitor portion and an end portion of the resonator portion, which faces the end portion of the capacitor portion in the Y-axis direction, in the negative direction of the Y-axis. The capacitance can be adjusted by adjusting a size of a gap between the capacitor portion and the resonator portion in the Y-axis direction.

Capacitor portion C1 is formed by a plurality of (eight in the example shown in FIG. 3) capacitive electrode elements 161 laminated in the lamination direction. Similarly, capacitor portion C2 is formed by a plurality of capacitive electrode elements 162 laminated in the lamination direction, capacitor portion C3 is formed by a plurality of capacitive electrode elements 163 laminated in the lamination direction, capacitor portion C4 is formed by a plurality of capacitive electrode elements 164 laminated in the lamination direction, and capacitor portion C5 is formed by a plurality of capacitive electrode elements 165 laminated in the lamination direction.

In the present embodiment, elements formed in the uppermost layer and the lowermost layer out of the plurality of capacitive electrode elements 161 is formed to have a width (dimension in the X-axis direction) that is smaller than widths of elements formed in layers near the center in accordance with resonant electrode element 141. The same applies to other capacitive electrode elements 162 to 165. The width of each of capacitive electrode elements 161 to 165 may all be the same value.

In FIG. 3, an example in which a height (the dimension in the Z-axis direction) of capacitor portion C1 is substantially the same as a height of resonator portion R1, the number of resonant electrode elements 141 is “eight” that is the same as the number of capacitive electrode elements 161, and eight resonant electrode elements 141 are formed in the same layers as eight capacitive electrode elements 161, respectively, is shown. However, the height of capacitor portion C1 and the number of capacitive electrode elements 161 do not necessarily need to be the same as the height of resonator portion R1 and the number of resonant electrode elements 141. The same applies to other capacitor portions C2 to C5 and capacitive electrode elements 162 to 165.

Although not shown in FIG. 3, in a place near each of the end portions of resonator portions R1 to R5 in the negative direction of the Y-axis, a capacitive electrode protruding toward an adjacent resonator portion in the X-axis direction may be separately formed. A degree of capacitive coupling between the resonator portions can be adjusted in accordance with a Y-axis-direction length of the capacitive electrode protruding in the X-axis direction, a distance from an adjacent distribution constant, and/or the number of electrodes configuring capacitor electrodes.

FIG. 4 is one example of a cross-sectional view of filter device 100 when filter device 100 is taken along a plane along a YZ-plane. In FIG. 4, a cross-sectional view of resonator portion R1 and capacitor portion C1 is representatively exemplified. The sectional shapes of other resonator portions R2 to R5 and capacitor portions C2 to C5 are also the same as the sectional shapes of resonator portion R1 and capacitor portion C1.

As shown in FIG. 4, in filter device 100, end portions of the plurality of resonant electrode elements 141, which form resonator portion R1, in the negative direction of the Y-axis, and end portions of the plurality of capacitive electrode elements 161, which form capacitor portion C1, in the positive direction of the Y-axis are disposed to face each other across gaps g1 to gn in the Y-axis direction, respectively. As a result, resonator portion R1 and capacitor portion C1 are configured to form a capacity in accordance with gaps g1 to gn by the end portions facing each other in the Y-axis direction.

Here, in filter device 100 according to the present embodiment, the number of capacitive electrode elements 161 connected to shield terminal 122 on the negative direction side of the Y-axis is set to be "eight", which is the same as the number of resonant electrode elements 141 connected to shield terminal 121 on the positive direction side of the Y-axis. Therefore, a case where electrode lamination density of a region in which capacitive electrode elements 161 are provided becomes coarser than the electrode lamination density of a region in which resonant electrode elements 141 are provided is suppressed as compared to a case where the number of capacitive electrode elements 161 is set to be "one" (see a filter described in Japanese Patent Laid-Open No. 2007-235465), for example.

In filter device 100 according to the present embodiment, resonant electrode elements 141 are formed such that all facing ends (end portions in the negative direction of the Y-axis) of resonant electrode elements 141 do not overlap with each other when resonant electrode elements 141 are viewed in a planar view from the lamination direction. Specifically, as shown in FIG. 4, lengths (the dimensions in the Y-axis direction) d1 to dn of the plurality of resonant electrode elements 141 are formed to gradually increase from the positive direction toward the negative direction of the Z-axis.

In filter device 100 according to the present embodiment, gaps g1 to gn in each layer are formed to be substantially constant in each layer in the lamination direction. Specifically, as shown in FIG. 4, the lengths of capacitive electrode elements 161 are formed to gradually become shorter from the positive direction toward the negative direction of the Z-axis as the lengths of resonant electrode elements 141 gradually become longer from the positive direction toward the negative direction of the Z-axis.

As a result, a difference in the electrode lamination density between the region in which gaps g1 to gn are provided and the region in which resonator portion R1 and capacitor portion C1 are provided can be reduced while causing gaps g1 to gn in each layer to be substantially constant.

In other words, the following occurs when the lengths of resonant electrode elements 141 are set to be constant and the lengths of capacitive electrode elements 161 are set to be constant. Although the gap in each layer can be substantially constant, electrode elements do not exist at all in the lamination direction of the region in which the gaps are provided. Therefore, the difference in the electrode lamination density between the region in which the gaps are provided and the region in which the resonator portion and the capacitor portion are provided increases. Meanwhile, in the present embodiment, as shown in FIG. 4, the lengths of resonant electrode elements 141 and the lengths of capacitive electrode elements 161 are changed in the lamination direction while gaps g1 to gn are set to be substantially constant. As a result, there are electrode elements in the lamination direction for the most part of the region in which gaps g1 to gn are provided. Therefore, the difference in the electrode lamination density between the region in which gaps g1 to gn are provided and the region in which resonator portion R1 and capacitor portion C1 are provided can be reduced.

Connection conductor 171 is formed by a plurality of via conductors that each connect adjacent electrode elements out of resonant electrode elements 141 to each other. In other words, adjacent resonant electrode elements 141 are electrically connected to each other in a position close to end portions in the negative direction of the Y-axis by connection conductor 171 (the via conductor). A distance from a facing end (an end surface in the negative direction of the Y-axis) of resonant electrode element 141 to connection conductor 171 (the via conductor) is set to the same value among the plurality of resonant electrode elements 141. In other words, the plurality of via conductors forming connection conductor 171 are disposed to be gradually shifted in the negative direction of the Y-axis from the positive direction toward the negative direction of the Z-axis.

An average value of lengths d1 to dn of the plurality of resonant electrode elements 141 is set to about λ/4, where λ represents a wavelength of the high-frequency signal transmitted by resonator portion R1. As a result, a high-frequency signal with wavelength λ can be efficiently transmitted by resonator portion R1. Instead of the lengths of the plurality of resonant electrode elements 141, an average value of the distance from connection conductor 151 to the facing end (the end surface in the negative direction of the Y-axis) of the plurality of resonant electrode elements 141 may be set to about λ/4.

As above, in filter device 100 according to the present embodiment, lengths d1 to dn of resonant electrode elements 141 are set to gradually become longer from the positive direction toward the negative direction of the Z-axis such that all of the facing ends (the end portions in the negative direction of the Y-axis) of resonant electrode elements 141 do not overlap with each other when resonant electrode elements 141 are viewed in a planar view from the lamination direction. The length of each of capacitive electrode elements 161 is set to gradually become shorter from the positive direction toward the negative direction of the Z-axis such that gaps g1 to gn become substantially constant. As a result, it becomes possible to secure the dimensional accuracy of filter device 100 by reducing the electrode lamination density difference in filter device 100.

Lengths d1 to dn of resonant electrode elements 141 may be set to gradually become shorter from the positive direction toward the negative direction of the Z-axis.

"Side surface 115", "side surface 116", and "laminated body 110" in the present embodiment may correspond to a "first side surface", a "second side surface", and a "laminated body" in the present disclosure, respectively. "Plate electrode 130" and "plate electrode 135" in the present embodiment may correspond to a "first plate electrode" and a "second plate electrode" in the present disclosure, respectively. "Shield terminal 121" and "shield terminal 122" in the present embodiment may correspond to a "first terminal" and a "second terminal" in the present disclosure, respectively. "Resonator portions R1 to R5" in the present embodiment may correspond to a "plurality of resonator portions" in the present disclosure. Each of "resonant electrode elements 141 to 145" in the present embodiment may correspond to a "plurality of resonant electrode elements" in the present disclosure. "The plurality of capacitor portions C1 to C5" in the present embodiment may correspond to a "plurality of capacitor portions" in the present disclosure. "Capacitive electrode elements 161 to 165" in the present embodiment may correspond to a "plurality of capacitive electrode elements" in the present disclosure, respectively.

Modified Example 1

Figure 5:
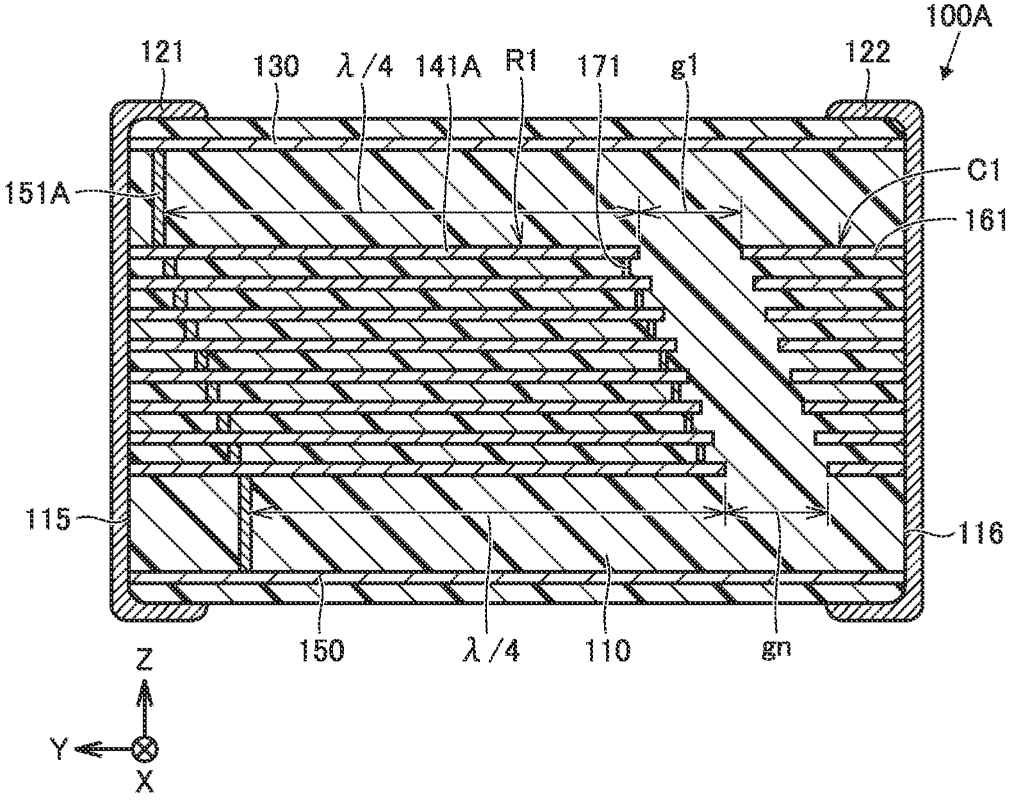
FIG. 5 is one example (part two) of a cross-sectional view of the filter device.

FIG. 5 is one example of a cross-sectional view of a filter device 100A according to Modified Example 1 of the present disclosure when filter device 100A is taken along a plane along a YZ-plane. Filter device 100A is obtained by changing connection conductor 151 of filter device 100 described above to a connection conductor 151A. In FIG. 5, a cross-sectional view of resonant electrode elements 141A and connection conductor 151A are representatively exemplified, but other resonant electrode elements 142 to 145 and connection conductors 152 to 155 also have sectional shapes similar to those of resonant electrode element 141A and connection conductor 151A. Other configurations of filter device 100A are the same as the configurations of filter device 100 described above.

Connection conductor 151 according to the embodiment described above linearly extends from plate electrode 130 to plate electrode 135 along the Z-axis direction by passing through the plurality of resonant electrode elements 141.

Meanwhile, connection conductor 151A according to Modified Example 1 is formed by a plurality of via conductors that each connect two adjacent ones out of plate electrode 130, the plurality of resonant electrode elements 141, and plate electrode 135. The plurality of via conductors forming connection conductor 151A are disposed to be gradually shifted in the negative direction of the Y-axis from the positive direction toward the negative direction of the Z-axis.

In filter device 100A according to Modified Example 1, in each resonant electrode element 141, a length from connection conductor 151A (via conductor) to a facing end is set to about λ/4.

As above, in filter device 100A according to Modified Example 1, connection conductor 151A is disposed to be gradually shifted in the negative direction of the Y-axis from the positive direction toward the negative direction of the Z-axis as the lengths of the plurality of resonant electrode elements 141 gradually become longer from the positive direction toward the negative direction of the Z-axis. As a result, the density of the current generated in each layer of resonant electrode element 141 when the high-frequency signal is transmitted through resonator portion R1 becomes even. Therefore, a filter with a better accuracy than filter device 100 according to the embodiment described above can be formed.

Lengths d1 to dn of resonant electrode elements 141 may gradually become shorter from the positive direction toward the negative direction of the Z-axis. In this case, connection conductor 151A only needs to be disposed in a shifted manner to be gradually shifted in the negative direction of the Y-axis from the positive direction toward the negative direction of the Z-axis.

By moving a position of connection conductor 151A, positions of short-circuit ends of resonant electrode elements 141 change. Therefore, the corresponding frequency can also be changed.

"Connection conductor 151A" in Modified Example 1 may correspond to a "plurality of via conductors" in the present disclosure.

Modified Example 2

Figure 6:
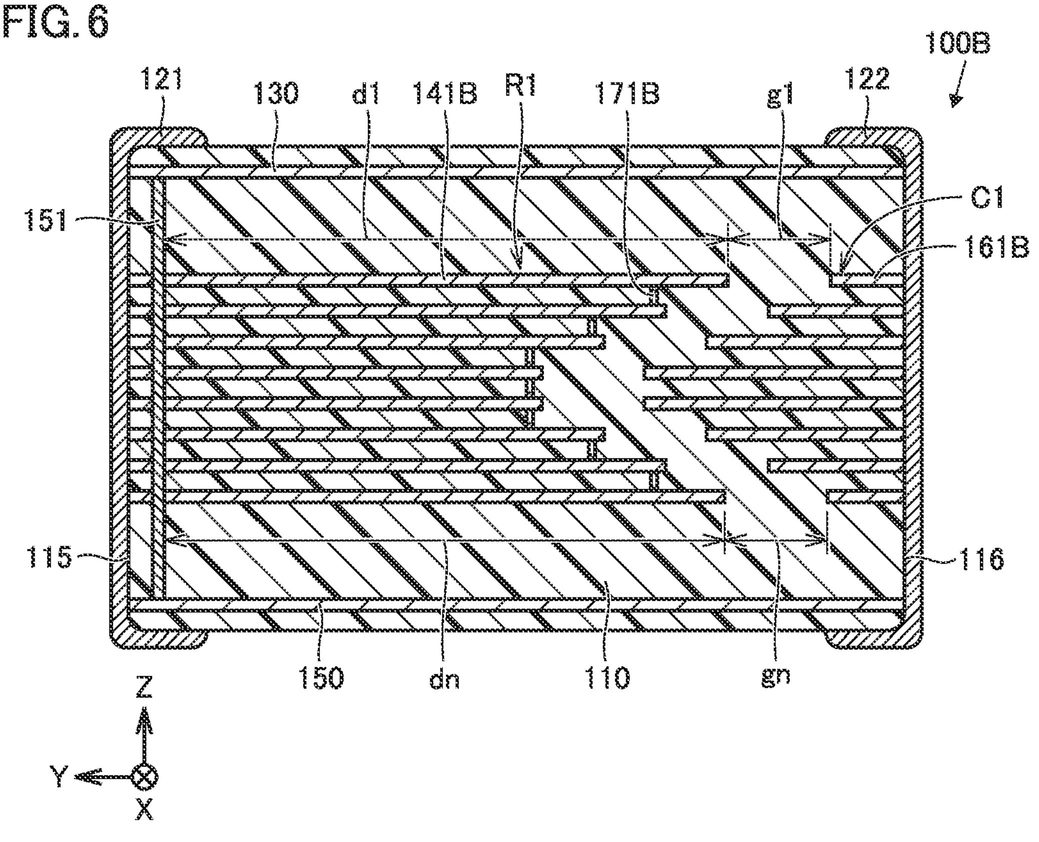
FIG. 6 is one example (part three) of a cross-sectional view of the filter device.

FIG. 6 is one example of a cross-sectional view of a filter device 100B in Modified Example 2 of the present disclosure when filter device 100B is taken along a plane along a YZ-plane. Filter device 100B is obtained by changing resonant electrode elements 141 and capacitive electrode elements 161 of filter device 100 described above to resonant electrode elements 141B and capacitive electrode elements 161B. In FIG. 6, a cross-sectional view of resonant electrode elements 141B and capacitive electrode elements 161B is representatively exemplified, but other resonant electrode elements 142 to 145 and capacitive electrode elements 162 to 165 also have sectional shapes similar to those of resonant electrode elements 141B and capacitive electrode elements 161B. Other configurations of filter device 100B are the same as the configurations of filter device 100 described above.

As shown in FIG. 6, in resonant electrode element 141B according to Modified Example 2, lengths (the dimensions in the Y-axis direction) of elements on an inner peripheral side in the lamination direction (Z-axis direction) are formed to be shorter than lengths of elements on an outer peripheral side. In other words, resonant electrode elements 141B are formed such that some of facing ends (end portions in the negative direction of the Y-axis) of resonant electrode elements 141B do not overlap with each other when resonant electrode elements 141B are viewed in a planar view from the lamination direction. In capacitive electrode elements 161B according to Modified Example 2, the lengths (the dimensions in the Y-axis direction) of elements on the inner peripheral side in the lamination direction are formed to be longer than the lengths of elements on the outer peripheral side. Elements of capacitive electrode elements 161B on the inner peripheral side extend in the positive direction of the Y-axis to a position in which the elements overlap with elements of resonant electrode elements 141B on the outer peripheral side in the lamination direction. As a result, the difference in the electrode lamination density between the region in which gaps g1 to gn are provided and other regions can be reduced while causing gaps g1 to gn in each layer to be substantially constant.

It is known that, when high-frequency signals are transmitted through resonator portion R1, most of the high-frequency signals do not evenly flow through the entirety of resonator portion R1 and have characteristics (so-called skin effect) of flowing through an outermost peripheral portion of resonator portion R1. Therefore, the influence on the characteristics of filter device 100 can be reduced by reducing the lengths of elements on the inner peripheral side through which the high-frequency signals do not flow much and increasing the lengths of elements on the outer peripheral side through which most of the high-frequency signals flow as in resonant electrode elements 141B according to Modified Example 2.

In Modified Example 2, elements of capacitive electrode elements 161B on the inner peripheral side extend in the positive direction of the Y-axis to a position in which the elements overlap with elements of resonant electrode elements 141B on the outer peripheral side in the lamination direction. Therefore, a capacity can be formed not only in the Y-axis direction but also in the lamination direction (Z-axis direction) between resonator portion R1 and capacitor portion C1. Therefore, it is particularly effective when a higher capacity is desired to be formed.

In resonant electrode element 141B according to Modified Example 2, a length (the dimension in the Y-axis direction) of an inner peripheral portion in the X-axis direction is formed to be shorter than a length of an outer peripheral portion in the X-axis direction.

Figure 7:
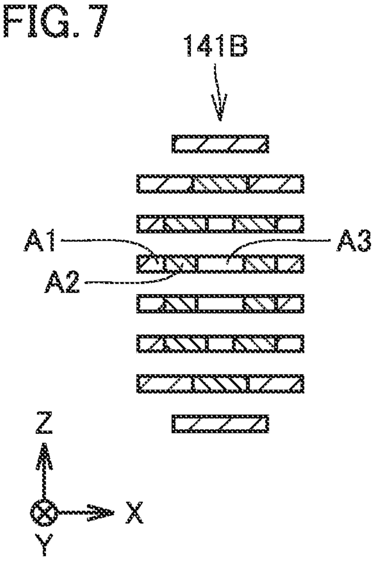
FIG. 7 is a view of resonant electrode elements viewed in a planar view from a negative direction of a Y-axis.

FIG. 7 is a view of resonant electrode elements 141B according to Modified Example 2 viewed in a planar view from the negative direction of the Y-axis. In FIG. 7, an outer peripheral portion of resonant electrode element 141B is indicated by "A1", an inner peripheral portion is indicated by "A3", and an intermediate portion between outer peripheral portion A1 and inner peripheral portion A3 is indicated by "A2".

The length (the dimension in the Y-axis direction) of inner peripheral portion A3 is shorter than the length of intermediate portion A2, and the length of intermediate portion A2 is shorter than the length of outer peripheral portion A1. In other words, in resonant electrode element 141B according to Modified Example 2, the length (the dimension in the Y-axis direction) of the inner peripheral portion in the X-axis direction is formed to be shorter than the length of the outer peripheral portion in the X-axis direction.

In resonant electrode element 141B according to Modified Example 2, the inner peripheral portion is formed to be shorter than the outer peripheral portion in both of the lamination direction (Z-axis direction) and the X-axis direction, but the direction in which the inner peripheral portion is shorter than the outer peripheral portion is not limited to being both of the lamination direction and the X-axis direction. In other words, the inner peripheral portion in at least one of the lamination direction and the X-axis direction only needs to be formed to be shorter than the outer peripheral portion.

Modified Example 3

Resonant electrode element 141 according to the embodiment described above is formed such that "the facing ends (the end portions in the negative direction of the Y-axis) of resonant electrode elements 141" do not overlap with each other when viewed in a planar view from the lamination direction.

Resonant electrode element 141 according to Modified Example 3 is formed such that "side surfaces of resonant electrode elements 141 perpendicular to the X-axis direction" do not overlap with each other when viewed in a planar view from the lamination direction.

Figure 8:
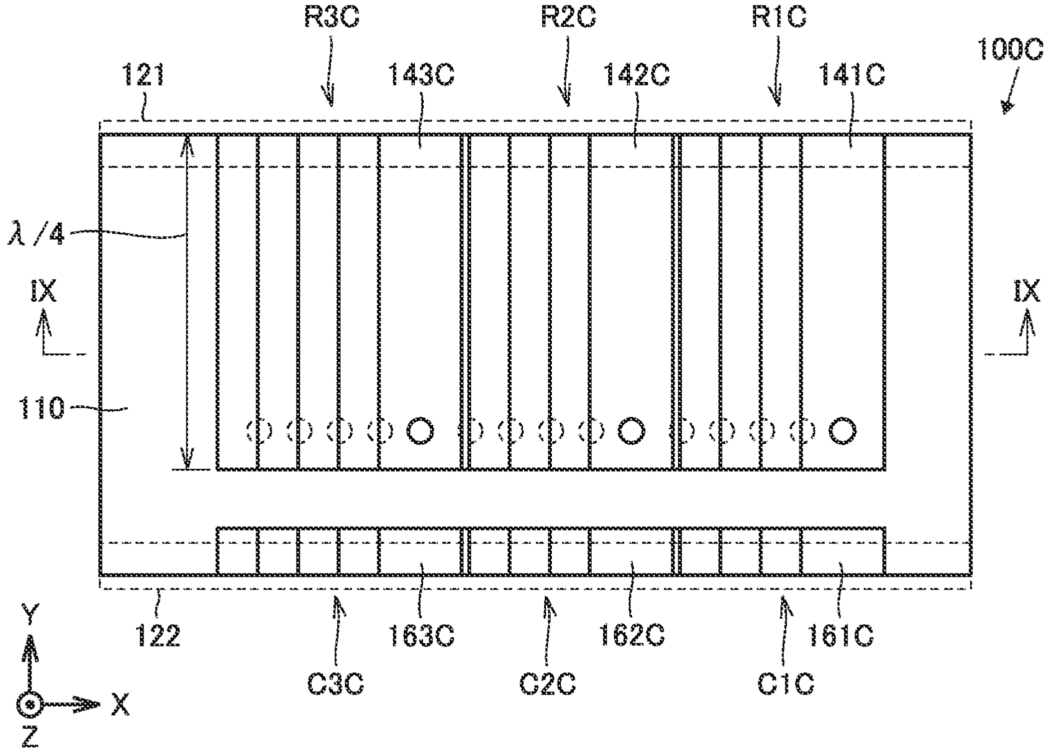
FIG. 8 is a perspective plan view of the filter device viewed from a positive direction of a Z-axis.
Figure 9:
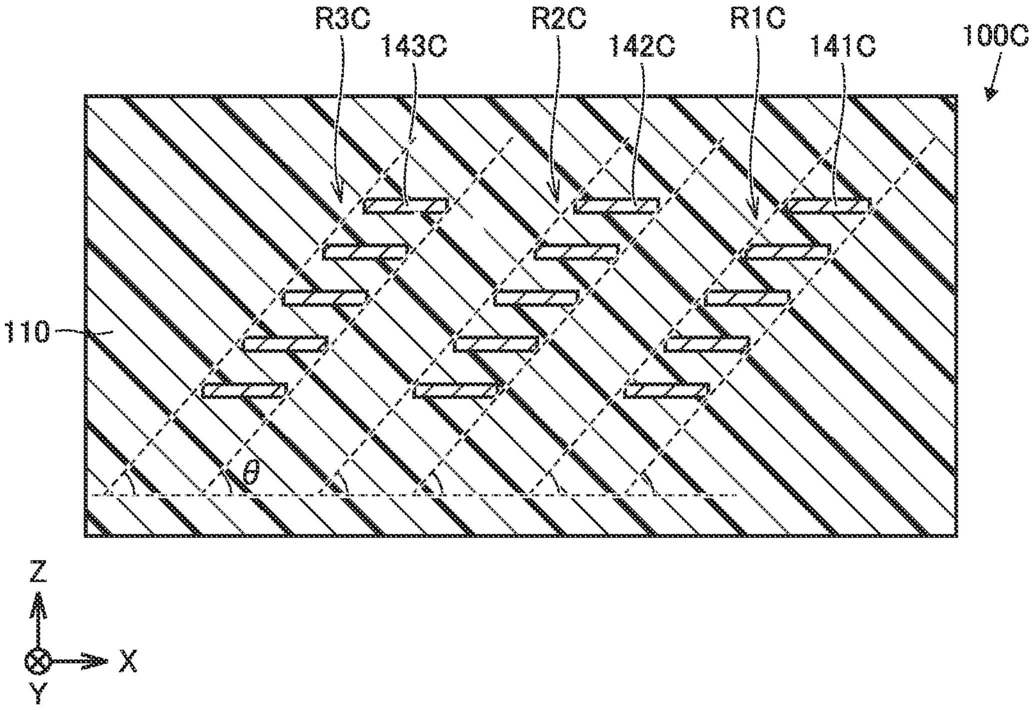
FIG. 9 is a sectional view taken along line IX-IX in FIG. 8.

FIG. 8 is a perspective plan view of a filter device 100C according to Modified Example 3 viewed from the positive direction of the Z-axis. FIG. 9 is a sectional view taken along line IX-IX in FIG. 8.

Filter device 100C according to Modified Example 3 is obtained by changing resonator portions R1 to R5 and capacitor portions C1 to C5 of filter device 100 described above to resonator portions R1C to R3C and capacitor portions C1C to C3C, respectively. Other configurations of filter device 100C are the same as the configurations of filter device 100 described above.

As shown in FIG. 8 and FIG. 9, the plurality of resonator portions R1C to R3C are disposed side by side in the X-axis direction. Resonator portion R1C is formed by a plurality of (five in the example shown in FIG. 8 and FIG. 9) resonant electrode elements 141C laminated in the lamination direction. Similarly, resonator portion R2C is formed by the plurality of resonant electrode elements 142C laminated in the lamination direction, and resonator portion R3C is formed by the plurality of resonant electrode elements 143C laminated in the lamination direction.

Capacitor portions C1C to C3C are disposed side by side in the X-axis direction so as to face end portions of resonator portions R1C to R3C in the negative direction of the Y-axis. Capacitor portion C1C is formed by a plurality of capacitive electrode elements 161C laminated in the lamination direction. Similarly, capacitor portion C2C is formed by a plurality of capacitive electrode elements 162C laminated in the lamination direction, and capacitor portion C3C is formed by a plurality of capacitive electrode elements 163C laminated in the lamination direction.

Lengths (the dimensions in the Y-axis direction) of the plurality of resonant electrode elements 141C to 143C are all set to the same value. Similarly, lengths (the dimensions in the Y-axis direction) of the plurality of capacitive electrode elements 161C to 163C are all set to the same value. As a result, gaps between resonator portions R1C to R3C and capacitor portions C1C to C3C in the Y-axis direction become substantially constant.

Widths (the dimensions in the X-axis direction) of the plurality of resonant electrode elements 141C to 143C and capacitive electrode elements 161C to 163C are all set to the same value.

Resonant electrode elements 141C according to Modified Example 3 are formed such that all side surfaces of resonant electrode elements 141C perpendicular to the X-axis direction do not overlap with each other when viewed in a planar view from the lamination direction. Specifically, as shown in FIG. 9, end portions of five resonant electrode elements 141C in the X-axis direction are formed to be disposed on a straight line inclined by an angle θ ($0° < θ < 90°$) with respect to the X-axis.

Similarly, resonant electrode elements 142C are formed such that all side surfaces of resonant electrode elements 142C perpendicular to the X-axis direction do not overlap with each other when viewed in a planar view from the lamination direction. Similarly, resonant electrode elements 143C are formed such that all side surfaces of resonant electrode elements 143C perpendicular to the X-axis direction do not overlap with each other when viewed in a planar view from the lamination direction.

As with each of resonant electrode elements 141C to 143C, each of capacitive electrode elements 161C to 163C is also formed such that all side surfaces of the resonant electrode elements perpendicular to the X-axis direction do not overlap with each other when each of the capacitive electrode elements is viewed in a planar view from the lamination direction.

By the configuration as above, the gaps between resonator portions R1C to R3C and capacitor portions C1C to C3C in the Y-axis direction can be set to be substantially constant, and the electrode lamination density difference in laminated body 110 in the X-axis direction can be reduced.

The resonant electrode elements may be formed such that all or some of both of the facing ends (the end portions in the negative direction of the Y-axis) with respect to the capacitive electrode elements and the side surfaces (the end portions in the X-axis direction) perpendicular to the X-axis direction of the resonant electrode elements do not overlap with each other when the resonant electrode elements are viewed in a planar view from the lamination direction by combining any one of the embodiment described above and Modified Examples 1, 2 with Modified Example 3.

It is to be understood that the embodiment disclosed above is merely an example in all aspects and in no way intended to limit the disclosure. The scope of the present disclosure is defined by the scope of the claims. All modifications made within the scope and spirit equivalent to those of the claims are intended to be included in the disclosure.

10 communication device, 12 antenna, 20 high-frequency front-end circuit, 22, 28 band-pass filter, 24 amplifier, 26 attenuator, 30 mixer, 32 local oscillator, 40 D/A converter, 50 RF circuit, 100, 100A, 100B, 100C filter device, 110, 110A, 110B laminated body, 111 upper surface, 112 lower surface, 113, 114, 115, 116 side surface, 121, 122 shield terminal, 130, 135, PL1 plate electrode, 141 to 145, 141A, 141B, 141C to 143C resonant electrode element, 151 to 155, 151A, 171 to 175 connection conductor, 161 to 165, 161B, 161C to 163C capacitive electrode element, C1 to C5, C1C to C3C capacitor portion, R1 to R5, R1C to R3C resonator portion, T1 input terminal, T2 output terminal, V10, V11 via.

The invention claimed is:

1. A dielectric filter, comprising:

a cuboid laminated body comprising a plurality of dielectric layers laminated in a lamination direction, the cuboid laminated body having a first side surface and a second side surface perpendicular to a first direction orthogonal to the lamination direction;

a first plate electrode and a second plate electrode disposed to be spaced apart from each other in the lamination direction on an inside of the laminated body;

a first terminal and a second terminal disposed on the first side surface and the second side surface of the laminated body, respectively, and connected to the first plate electrode and the second plate electrode;

a plurality of resonator portions disposed side by side in a second direction orthogonal to the lamination direction and the first direction in a region between the first plate electrode and the second plate electrode in the laminated body; and a plurality of capacitor portions disposed to face the plurality of resonator portions, respectively, in the first direction in a region between the plurality of resonator portions and the second terminal in the laminated body, wherein:

each of the plurality of resonator portions comprises a plurality of resonant electrode elements laminated in the lamination direction, is connected to the first terminal, and is spaced apart from the second terminal;

each of the plurality of capacitor portions comprises a plurality of capacitive electrode elements laminated in the lamination direction, is connected to the second terminal, and provides a capacity between each of the capacitor portions and each of the resonator portions facing each of the capacitor portions in the first direction;

the plurality of resonant electrode elements in each of the resonator portions are provided such that all or some of at least one of facing ends and side surfaces, the facing ends facing the plurality of capacitive electrode elements, the side surfaces being perpendicular to the second direction, do not overlap with each other when viewed in a planar view from the lamination direction; and the plurality of capacitive electrode elements in each of the capacitor portions are provided such that a distance between a resonant electrode element and a capacitive electrode element is substantially constant in each layer in the lamination direction, the resonant electrode element and the capacitive electrode element facing each other in the first direction.

2. The dielectric filter according to claim 1, wherein:

each length of the plurality of resonant electrode elements in each of the resonator portions is different from each other in the first direction; and each length of the plurality of capacitive electrode elements in each of the capacitor portions is different from each other in the first direction.

3. The dielectric filter according to claim 2, wherein an average value of each length of the plurality of resonant electrode elements in each of the resonator portions in the first direction is about λ/4, where λ represents a wavelength of a high-frequency signal transmitted by the dielectric filter.

4. The dielectric filter according to claim 2, further comprising a plurality of connection conductors connecting each of the plurality of resonator portions to the first plate electrode and the second plate electrode, wherein:

each of the plurality of connection conductors comprises a plurality of via conductors each connecting two adjacent ones out of the plurality of resonant electrode elements, the first plate electrode, and the second plate electrode; and a length from the via conductor of each of the resonant electrode elements to the facing end is about λ/4, where λ represents a wavelength of a high-frequency signal transmitted by the dielectric filter.

5. The dielectric filter according to claim 1, wherein each of the resonator portions is provided such that a portion on an inner peripheral side in at least one of the lamination direction and the second direction is shorter in length in the first direction than a portion on an outer peripheral side.

* * * * *